Aug. 4, 1936.　　　　E. BROCKMAN　　　　2,050,157
PNEUMATIC SUSPENSION FOR VEHICLES
Filed Nov. 15, 1933　　　2 Sheets-Sheet 1

Inventor,
Edwin Brockman,
by Walter P. Geyer
Attorney.

Aug. 4, 1936.  E. BROCKMAN  2,050,157
PNEUMATIC SUSPENSION FOR VEHICLES
Filed Nov. 15, 1933  2 Sheets-Sheet 2
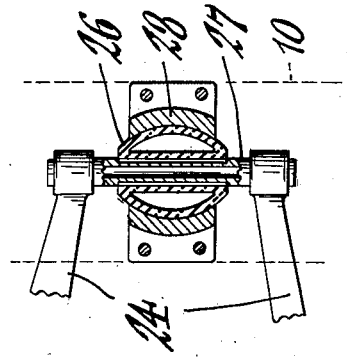
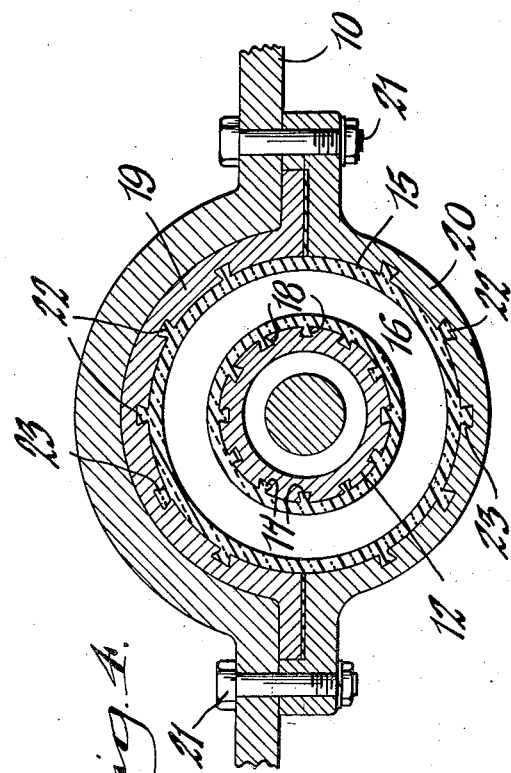
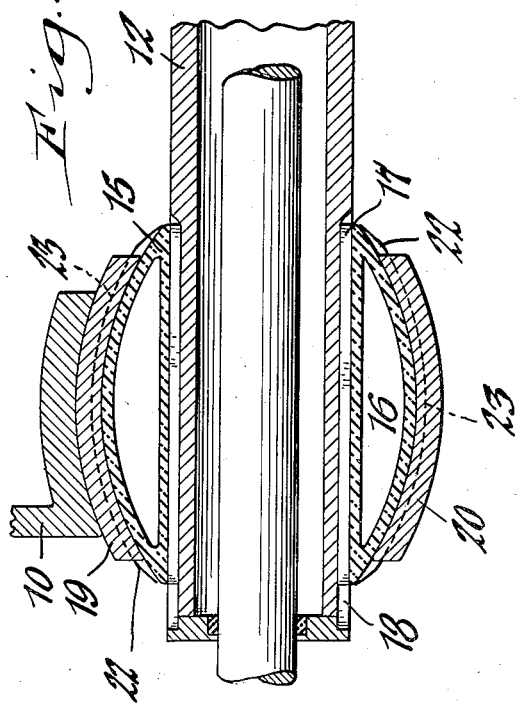
Inventor,
Edwin Brockman,
by Walter P. Geyer
Attorney.

Patented Aug. 4, 1936

2,050,157

UNITED STATES PATENT OFFICE 2,050,157

PNEUMATIC SUSPENSION FOR VEHICLES

Edwin Brockman, Buffalo, N. Y., assignor of one-half to Howard M. Kaercher, Buffalo, N. Y.

Application November 15, 1933, Serial No. 698,112

6 Claims. (Cl. 267—35)

This invention relates generally to certain new and useful improvements in pneumatic suspension means and more particularly to a suspension means or unit for motor vehicles and the like.

One of its objects is the provision of a pneumatic suspension means which has been designed to effectually resist or absorb the shocks incident to a vehicle travelling over streets or highways.

Another object is to provide a pneumatic suspension means for vehicles which eliminates the use of the conventional type of springs, shackles and ancillary shock-absorbing means, and which is so mounted between the vehicle body or frame and the axles of the vehicle as to absorb shocks imposed in both vertical and horizontal planes.

A further object of the invention is to provide a pneumatic suspension means which is simple, compact and inexpensive in construction, which may be readily installed, and which is free from any moving parts requiring lubrication or adjustment.

Other features of the invention reside in the construction and arrangement of parts hereinafter described and particularly pointed out in the appended claims.

In the accompanying drawings:—

Figure 1:
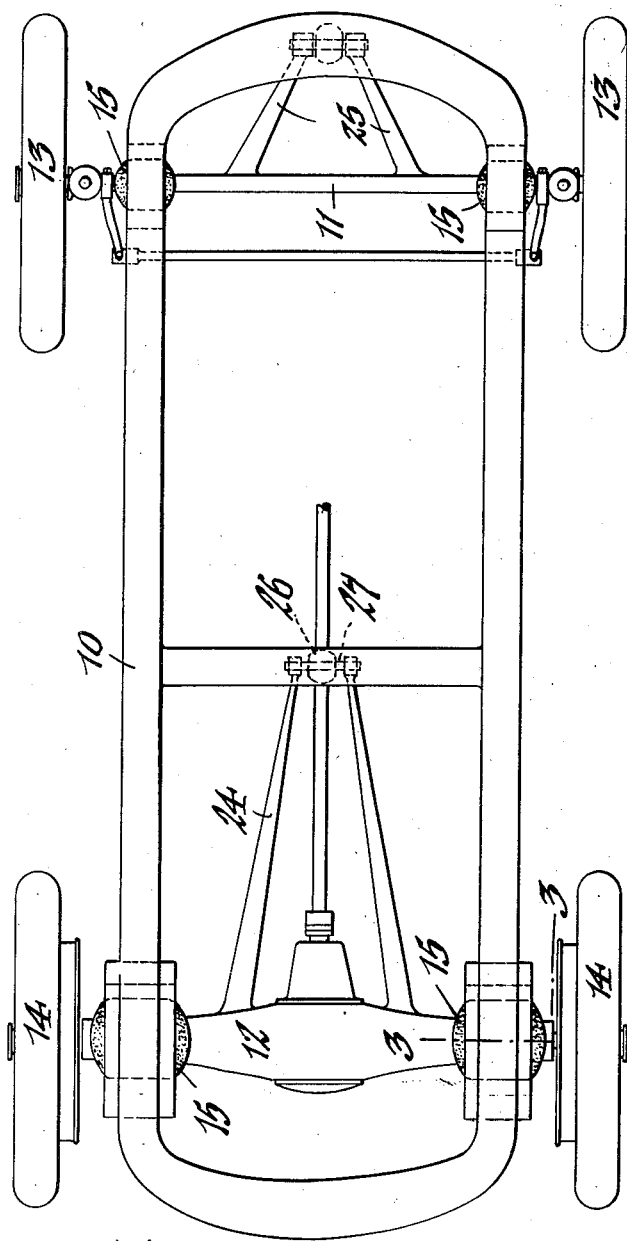
Figure 2:
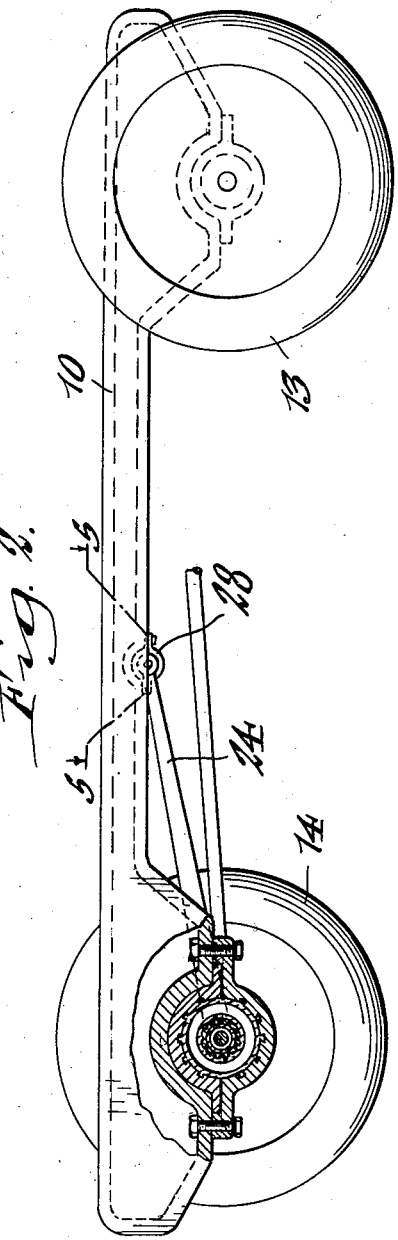

Figure 1 is a plan view of the chassis of a motor vehicle showing my invention applied thereto. Figure 2 is a side elevation thereof, partly in section. Figure 3 is an enlarged fragmentary section taken substantially in the plane of line 3—3, Figure 1. Figure 4 is a cross section taken on line 4—4, Figure 3. Figure 5 is an enlarged horizontal section taken substantially in the plane of line 5—5, Figure 2.

Similar characters of reference indicate corresponding parts throughout the several views.

By way of example, my invention has been shown as constituting a pneumatic suspension unit for motor vehicles, although it is to be understood that it is applicable to any installation embodying opposed members movable toward and from each other. The numeral 10 indicates the chassis-frame upon which the vehicle body (not shown) is mounted in the usual and well known manner, and 11 and 12 indicate the front axle and rear axle assembly, respectively, upon which the front and rear wheels 13 and 14 are mounted in the customary manner. In accordance with my invention, a pneumatic suspension unit is disposed at four points between the chassis frame and front and rear axles of the vehicle, and inasmuch as the several suspension units are identical in construction, a description of one will suffice for all.

Each of these pneumatic suspension units is applied to the opposite ends of the front and rear axle assemblies of the vehicle at a point in vertical alinement with the vehicle frame, and is preferably constructed as follows:—

The numeral 15 indicates the pneumatic element of the suspension unit which is in the form of an annulus consisting of an air container of rubber or like elastic material shaped to simulate a double-walled collar having an air space or compartment 16 extending completely about the same and which space may be filled with air or other compressible fluid. As shown in Figure 3, this container, in longitudinal cross section, is substantially oval in shape, although it is to be understood that it may be of any other desired shape in cross or longitudinal section. This pneumatic container is adapted for endwise application to the axle 11 or 12 and its bore is provided with longitudinal keys or tongues 17 which are dove-tail in shape and are adapted to engage corresponding key-ways or splines 18 formed in the exterior of the axle assembly, as shown in Figures 3 and 4, whereby circumferential displacement of the container relative to the axle is prevented. Enclosing the outer wall or periphery of the pneumatic container 15 is a sectional housing consisting of an upper semi-circular section 19 extending over the upper half-portion of the container and a lower semi-circular section 20 extending over the lower half portion of the container, these sections being suitably clamped or fixed to the chassis frame 10 by bolts 21 or like fasteners. As shown in Figure 3, while the inner faces of the housing sections conform to the arcuate curvature of the pneumatic container, they terminate short of the ends of the container so as to leave such ends exposed and free to expand and contract in accordance with the shock impulses which the pneumatic containers are called upon to absorb. By preference, the outer surface of the pneumatic container 15 is provided with longitudinally-extending keys or tongues 22 which engage corresponding splines or key-ways 23 in the inner walls of the housing sections 19 and 20, whereby the container is reliably interlocked to the chassis frame to prevent its circumferential movement relative thereto.

By this construction and arrangement of parts, the weight of the chassis-frame and vehicle body is supported on a fluid-displaceable cushion and the vehicle-axles have a floating connection with the suspension units. When the vehicle wheels encounter an obstruction or depression in the highway, the axles accordingly move upwardly or downwardly with the resulting shock impulse absorbed by the pneumatic container 15 above or below its axis. The displaced fluid in the container, due to the shock impulse, travels in a direction opposite to the direction of the impulse and during the ensuing rebound action of the axle or body, shock waves are created in the opposite direction which meet or encounter the previous waves set up from the initial shock impulse at a point diametrically of the container, where the impulses seek a balance and a state of rest between the frame and axles is attained. These pneumatic suspension units in addition to absorbing vertical shocks are also effective in absorbing horizontal shocks either from the front, rear or side of the vehicle. Furthermore, the ovoidal shape of the pneumatic container provides an extensive bearing surface between the relatively movable parts to thereby effectually resist side sway of the vehicle and afford a more uniform distribution of air pressure for shock-absorbing purposes.

As shown in Figure 1, the front and rear axles 11 and 12 are provided with forwardly projecting torque rods 24 and 25, respectively, which are connected at their free or forward ends with the adjoining portions of the chassis-frame 10 through the medium of a pneumatic suspension unit similar to that previously described. Each of these units, one of which is clearly shown in Figure 5, consists of a pneumatic container 26 applied to the tie bar 27 of the torque rods and supported at its periphery in a sectional housing 28 secured to the chassis-frame 10. By thus mounting the free ends of the torque rods, a flexible and shock-absorbing connection is provided between the frame and the rods.

I claim as my invention:—

1. A suspension means for disposition between two relatively movable members, comprising an annulus of ovoidal shape in cross section containing a compressible fluid and adapted to encircle one of said members, the inner and outer walls of said annulus meeting at their opposite edges in substantially an acute angle, and means embracing the periphery of said annulus for connection to the other of said members, the angular ends of said annulus extending beyond and being free of said embracing means.

2. A suspension means for disposition between an axial member and an opposing relatively movable member, comprising a pneumatic annulus of substantially ovoidal shape in cross section having its bore engaging said axial member and its periphery converging at its ends toward and intersecting the corresponding ends of said bore, and a housing extending about the periphery of said annulus and terminating short of the ends thereof for attachment to the relatively movable member.

3. A suspension means for disposition between the front and rear axles and the chassis-frame of a vehicle, comprising double-walled collars of ovoidal shape in cross section containing a compressible fluid and having their bores fitted over the ends of the respective axles, the outer wall of each collar converging at its opposite ends toward and intersecting the corresponding ends of the inner wall, and means for connecting said collars at their peripheries to the chassis-frame, said means embracing the collars and terminating at their ends short of the converging ends of said collars.

4. A pneumatic suspension means for disposition between two relatively movable members, comprising an ovoidal-shaped pneumatic element having a bore engaging one of said members and having its periphery engaging the other of said members, the periphery converging gradually toward the ends of the bore to provide substantially acute angular ends and the corresponding ends of such other member terminating short of said angular ends.

5. A suspension means of the character described, comprising a double-walled collar having a space for a compressible fluid, the inner wall of said collar being adapted for connection to one of two relatively movable members and the other wall of said collar converging at its ends toward and intersecting said inner wall in substantially an acute angle and being embraced by the other movable member throughout its length excepting at the ends thereof including the acute angle.

6. A suspension means of the character described, comprising a double-walled collar having a space for a compressible fluid, the inner wall of said collar being adapted for connection to one of two relatively movable members and the other wall of said collar converging at its ends toward and intersecting said inner wall in substantially an acute angle and being embraced by the other movable member throughout its length excepting at the ends thereof including the acute angle, and complementary dove-tail interlocking means on the contiguous walls of the collar and said members for preventing relative rotation of such parts and radial separation of the collar from said members.

EDWIN BROCKMAN.